ELECTRONICALLY CONTROLLED TELECOMMUNICATION SYSTEM

Filed June 21, 1966 6 Sheets-Sheet 1

INVENTORS
VILNIS LAPSEVSKIS
AKE BERTIL FREDRIK SVENSSON
BY Hane and Nydick
ATTORNEYS INVENTORS
Vilnis Lapsevskis
Åke Bertil Fredrik Svensson
BY
Hane and Nydick
Attorneys Nov. 11, 1969 V. LAPSEVSKIS ET AL 3,478,173

ELECTRONICALLY CONTROLLED TELECOMMUNICATION SYSTEM

Filed June 21, 1966 6 Sheets-Sheet 3

INVENTORS
Vilnis Lapsevskis
Ake Bertil Fredrik Svensson
BY
Hane and Nydick
Attorneys INVENTORS
Vilnis Lapsevskis
Åke Bertil Fredrik Svensson
BY
Hane and Nydick
Attorneys INVENTORS
Vilnis Lapsevskis
Åke Bertil Fredrik Svensson
BY Hane and Nydick
Attorneys

ELECTRONICALLY CONTROLLED TELECOMMUNICATION SYSTEM

Filed June 21, 1966 6 Sheets-Sheet 6

INVENTORS
VILNIS LAPSEVSKIS
AKE BERTIL FREDRIK SVENSSON
BY
Hane and Nydick
ATTORNEYS United States Patent Office 3,478,173

Patented Nov. 11, 1969

3,478,173
ELECTRONICALLY CONTROLLED TELECOMMUNICATION SYSTEM

Vilnis Lapsevskis and Åke Svensson, Hagersten, Sweden, assignors to Telefonaktiebolaget LM Ericsson, Stockholm, Sweden, a corporation of Sweden Filed June 21, 1966, Ser. No. 559,202
Claims priority, application Sweden, June 30, 1965, 8,620/65
Int. Cl. H04m 3/42
U.S. Cl. 179—18 3 Claims

ABSTRACT OF THE DISCLOSURE

An electronically controlled telecommunication system includes electronic control means which operate via binary numbers representing voltage relay units. These units in turn, operate connections for cross bar switches each including a plurality of contact bridges. The indicating contacts of the bridges coact with potential dividers to set up coded combinations of voltage representing a binary number indicating the state of the bridges of a selected cross bar switch. Reading circuits transmit the combinations of voltage to the electronic control means.

Figure 1:
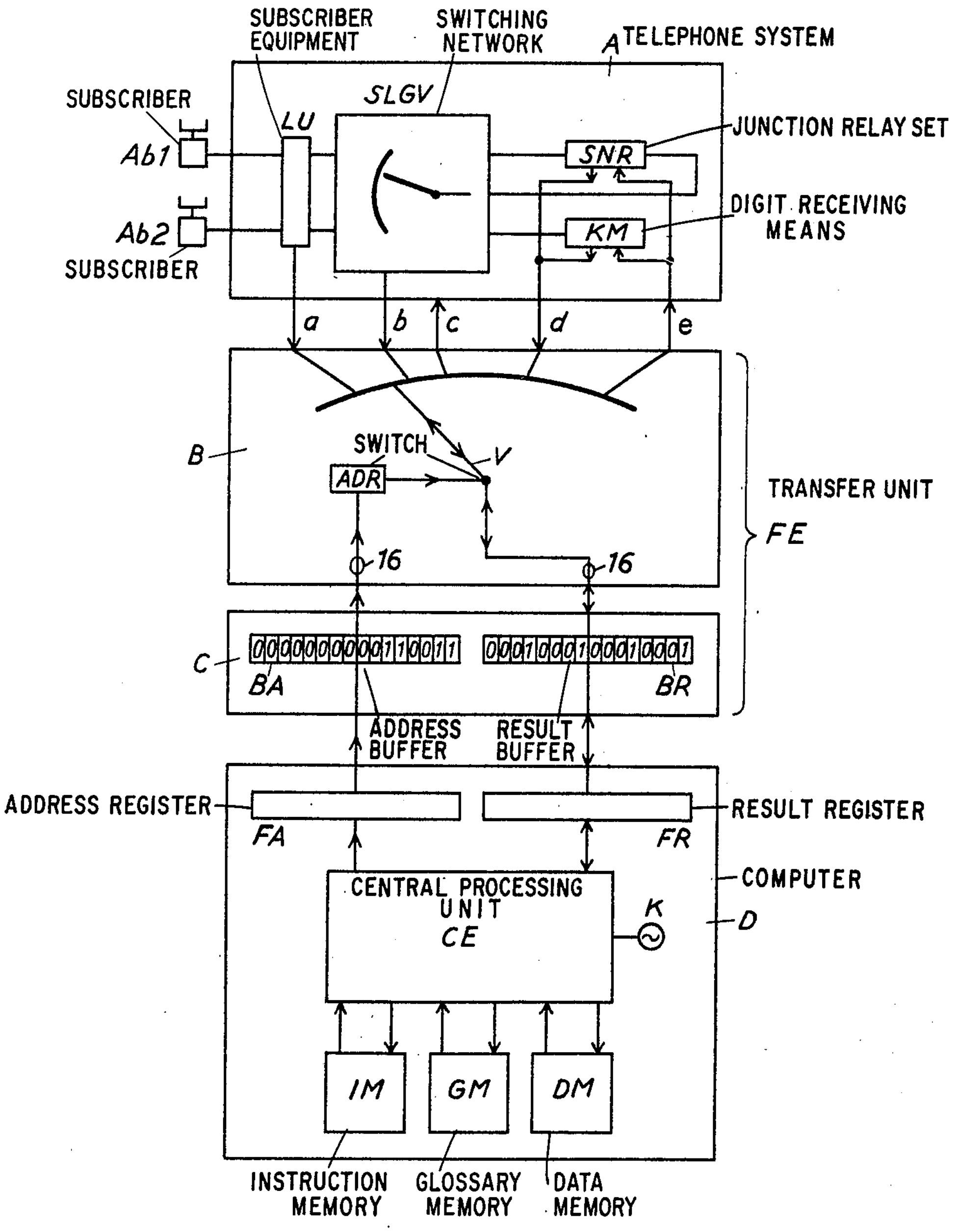

The invention refers to a circuit arrangement for indicating, in the form of a binary number, a position to which a crossbar switch is set in an automatic telecommunication system in which computers or other electronic control means operate, by means of binary words, relay operation units which in turn operate a desired connecting means (selector, relay set, line equipment) and select one of said means, respectively, in order that the computer should be able to control its condition.

A telecommunication system of this type includes a transfer unit which comprises the relay operation units as well as reading matrices. The transfer unit transforms the binary information obtained from the computer into signals which can control the relay units and furthermore forms by means of the potentials obtained from the connecting means condition reading words indicating idle and busy conditions, respectively. The rows which contain the binary condition reading words are selected by the computer by means of a binary position selecting word valid for the respective row. The position selecting word in a signal translating means which also is included in the transfer unit is transformed into a selecting signal. This selecting signal activates the desired row in the reading matrix.

In such a communication system it is important to be able to control that a switch has been set to a position that corresponds to the setting order and to be able to control to which position a switch is set respectively. This last mentioned fact is of importance for allowing that, for example, a new writing of all switch conditions is carried out in the computer if the records due to some fault should have been destroyed or for being able to trace a connecting path through the switches. Such control is made possible according to the present invention.

The arrangement according to the invention is characterized in that each of the bridges in the crossbar switches is provided with a group of indicating contacts. At least one definite contact is adapted to be actuated in each bridge position so that the contact group, by means of the two different conditions in the contacts, represents a binary word that is characteristic for the position of the bridge. There is a common reading circuit associated with the indicating contacts having the same position in the bridges. The common reading circuit normally has a potential corresponding to an idle condition but by closing one of the indicating contacts can be connected to a determined potential value that brings the reading circuit to a potential corresponding to working condition, so that the group of reading circuits forms a binary word that is readable by the computer and represents the position of the indicating contacts. The invention is further characterized in that, in order to make it possible for the group of reading circuits to indicate the binary word for a definite bridge that is selected for control, each operated indicating contact is connected to a tap of a voltage divider belonging to the bridge. The potential of all the taps of the unselected bridges differs from the potential value of a selected bridge.

Figure 2:
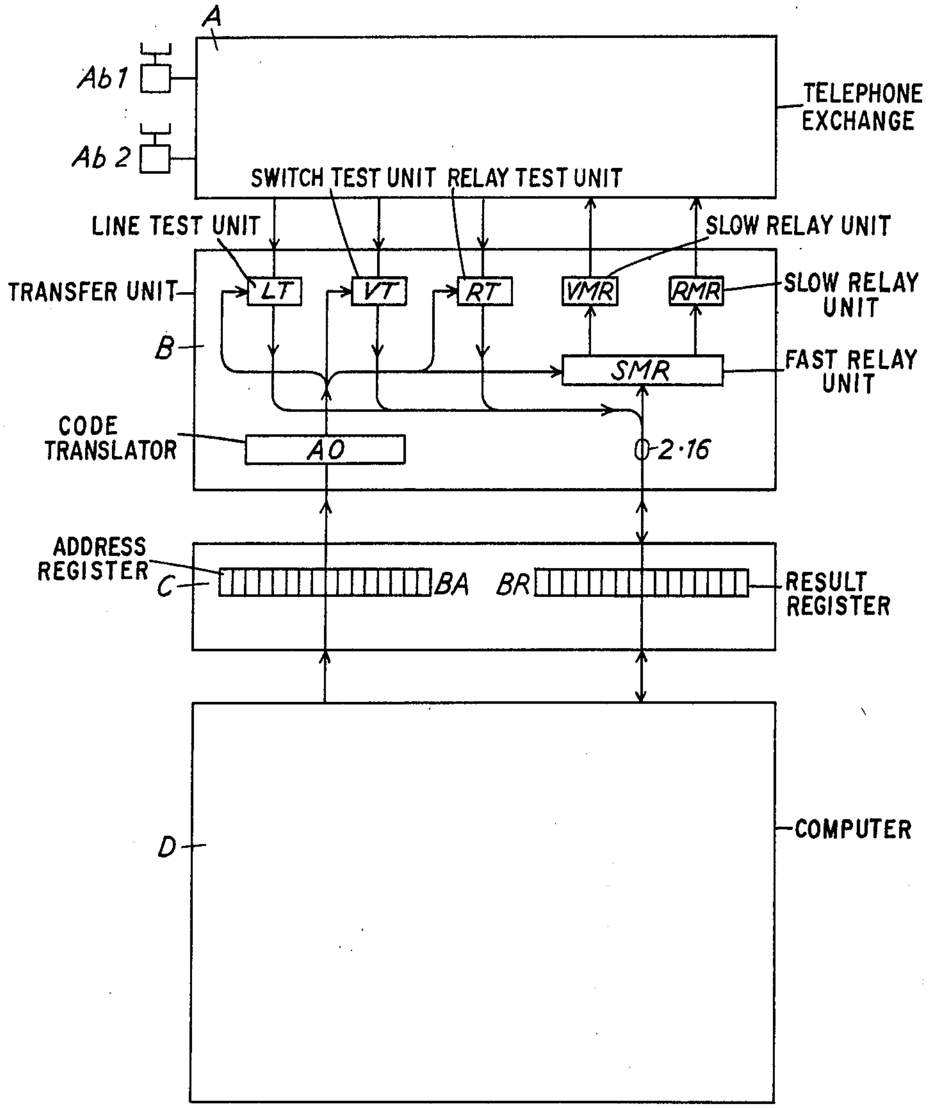
Figure 3:
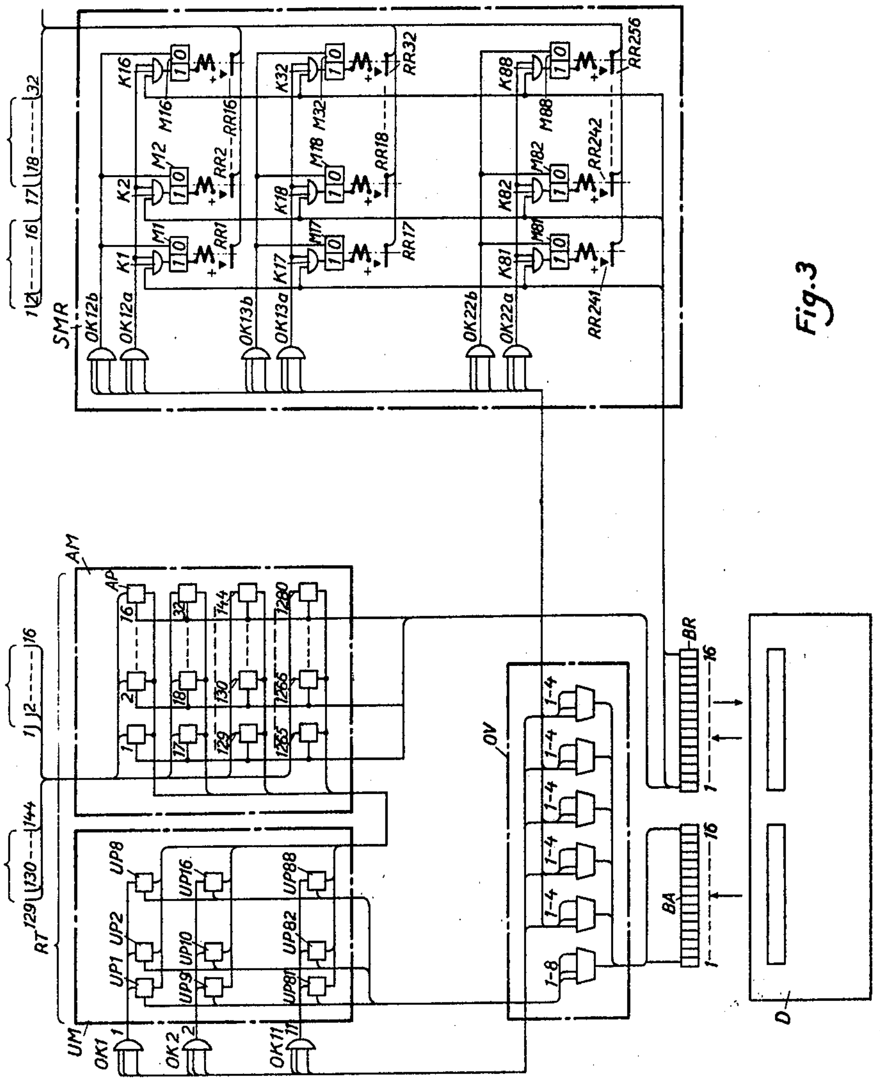
Figure 4:
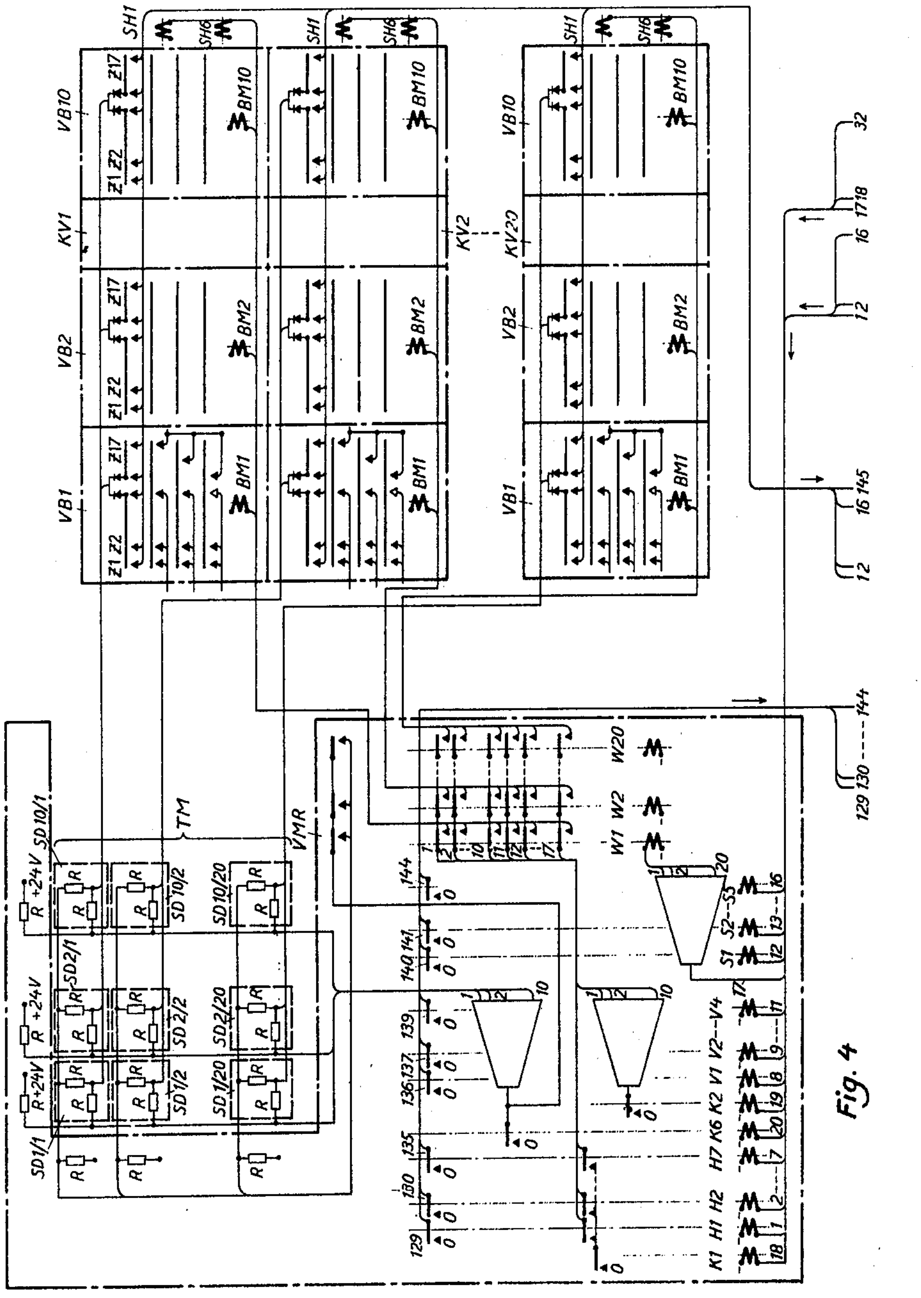
Figure 6:
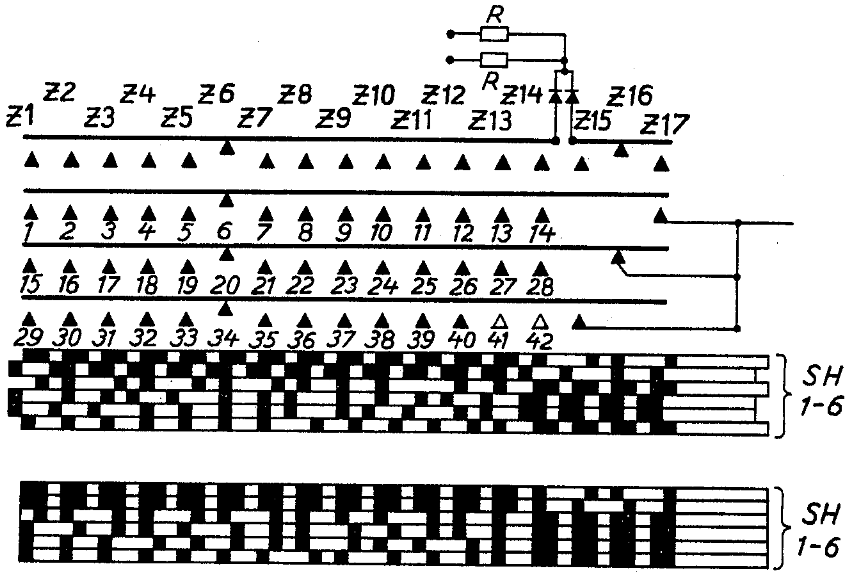
Figure 5:
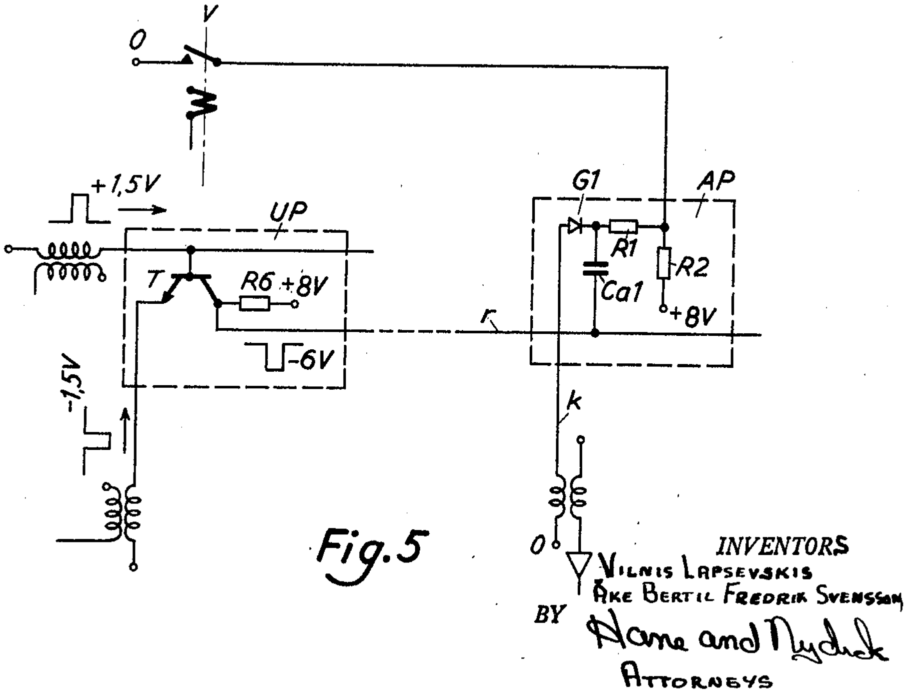

The invention will be explained here below by means of an embodiment with reference to the accompanying drawings in which FIG. 1 shows a block diagram of a computer controlled telephone system; FIG. 2 shows the block diagram according to FIG. 1 with the transfer unit more in detail; FIG. 3 shows a test unit from which the computer obtains information in the form of a binary word concerning the condition of the different connecting means, and a fast relay operation unit that, by means of the signals obtained from the computer, operates a relay operation unit; FIG. 4 shows a group of siwtches together with a relay unit intended for their operation; FIG. 5 shows a crossing point in the selecting matrix in detail; FIG. 6 shows the location of the contacts in a code relay switch bridge; and FIGS. 7*a*–7*k* shows the binary words which, upon setting a switch, are obtained from the computer and the binary words which are sent to the computer when a switch is set, respectively.

FIG. 1 shows diagrammatically the three principal parts included in a computer controlled or stored program controlled telephone exchange. By A is indicated a telephone system of for example the conventional type, comprising switch stages, digit receiving means KM and junction relay sets SNR by means of which a calling subscriber A*b*1 can be connected to a called subscriber A*b*2. In comparison with a conventional telephone exchange no control means are however found and all test functions and selection of connecting paths are, instead, carried out by means of a computer D. The computer obtains information about the identity of the subscribers and of the connecting means together with the information concerning their busy-or idle condition in the form of binary numbers. Then, from a list that includes in sequential order all the connecting paths required for a connection between two desired points in the telephone exchange, selects the connecting path next in turn in which all connecting means are idle and operates thereafter all the means included in the connecting path by sending control orders in the form of binary words. Thus there are binary information words concerning the condition of the lines and of the relays, which words are fed to the computer, and also binary information words which are fed from the computer to the telephone exchange in order to operate the connecting means. This may occur in both directions for example in the form of 16-digit binary words.

With regard to the great difference between the operational speed of the computer with which the binary words operating the connecting means, are produced and the operational speed of the relays and of the switches, a transfer unit FE is needed which stores the information obtained from the computer until the more slowly working means have been operated, and which stores the condition information obtained from the telephone system until the information concerning the condition has been supplied to the computer, as will be explained more in detail. The binary words containing information as to the condition of the connecting means and the binary words containing information as to which connecting means are to be operated do not necessarily refer to individual means but also to groups of means (subscriber's line equipments, switches, relays, etc.) according to the example including 16 means. In the words the idle condition of an arbitrary means is represented by, for example, "0" while the busy condition is represented by "1." In a similar manner "1" can mean that the connecting means that corresponds to the digit position in the word obtained from the computer, is to be operated while the means associated with the corresponding digit position having a "0" will not be operated in the respective 16-group.

In order to be able to find a 16-group from which test information is to be obtained and to which the operating instruction is to be sent respectively, an address information is necessary for which purpose also a word containing 16 binary digits is used. This is indicated in FIG. 1 diagrammatically by means of a switch symbol V which shows that the 16 conductors which supply the condition information to the computer and the operating information from the computer to the connecting means respectively, can be connected to those means, the position of which is determined by the address information from the computer, obtained through further 16 lines. The connecting paths *a–e* to and from the telephone system indicate three sampling functions, viz. sampling of the subscriber's condition (*a*), of the switch condition (*b*) and of the condition of a junction relay set SNR or of a digit receiver KM (*d*), and two operating functions, viz. switch operation (*c*) and junction relay set- and digit receiver operation (*e*). These functions are sufficient to explain the fundamental operation of the system.

The transfer unit FE consists of two parts, one of which, B, contains means which can cooperate with the rather slow electromechanical means, for example the relays in the telephone system, and the other part C contains buffer means which can store the rapid information obtained from the computer and forward it to those parts which operate the relays and the switches. The parts B and C in the transfer unit can be located geographically separated from each other, for example at a distance of 100 meters, the part B being located near to or in the telephone network itself, while the part C is located in or in the immediate vicinity of the computer D.

In FIG. 1 two buffers are indicated in the transfer unit FE, of which buffers the address buffer BA is through 16 conductors in communication with an address register FA, into which the computer feeds the computed address in the form of a 16-digit binary word, and the other, the result buffer BR is through 16 conductors in communication with a result register FR to which the computer supplies the computed operating information in the form of a 16-digit binary word or to which the information concerning the condition sampled in the telephone system is supplied from the transfer unit FE. According to FIG. 1 in the address buffer BA is written an address, for example the binary word 0000000000110011. In the result buffer BR is simultaneously written the binary word 0001000100010001 which for example can indicate that in a group of 16 means, for example switches, the identity of which group is defined by said address, the first, the fifth, the ninth and the thirteenth switch are busy while the other switches are idle. The binary number written in the result register can however also contain an information in code form, for example the binary number 0000000000111111 implying that, for example, in a means selected by the address and containing several relays, certain relays are to be operated.

As previously mentioned, means are necessary in the transfer unit which can be operated by the information obtained in rapid sequence from the computer and which store this information until it by a relatively slower means had sufficient time to operate relays or switches. FIG. 2 shows the transfer unit somewhat more in detail than FIG. 1 and includes such means SMR, which can store the information words obtained in rapid sequence from the computer and herebelow are called fast relay operation units. By VMR is indicated a switch operation unit and by RMR a relay operation unit which two last mentioned units obtain their operating signals from unit SMR. Also the means are shown which give information to the computer concerning the condition of the respective means, thus a line test device LT, a switch test device VT and a relay test device RT. These three last mentioned means do not need any transfer unit in the direction towards the computer owing to the difference in operational speed, because the sampling can occur at a rate determined by the computer. The transfer unit also comprises a code translating means A0 which translates the binary address information obtained from the computer into a position in space and vice versa.

It should be pointed out that a fast relay operation unit SMR can serve simultaneously a number of, for example 10 slow units VMR, RMR and that the number of the relay units SMR is sufficiently large to receive sequentially all information obtained from the computer with great speed and to store it until the respective operation has been carried out by the used slow unit. If for example a VMR unit has been occupied, the next free VMR unit is used by the computer on the basis of the condition information being at the disposal of the computer.

In FIG. 3 a test unit RT produces an information readable by the computer concerning for example the busy- or the idle condition of the switch bridges VB1, VB2, etc. (FIG. 4) and the position of the switch bridges respectively. The test unit RT contains a reading matrix AM in which each crossing point corresponds to one of the means, for example relays, whose condition is to be tested or to one of the contacts which indicates a bridge number or a bridge position as it will be explained herebelow. These points are selected row by row by the computer by supplying a pulse-shaped signal to a row wire belonging to the respective row. Associated with each point is a capacitor which when obtaining said pulse-shaped signal, can be discharged if it has been previously charged owing to the busy condition of the means, for example the relays, belonging to the respective point or owing to the closed position of the contact belonging to the respective point as will be explained in connection with FIG. 5. Through the column wires belonging to points having charged capacitors, a pulse-shaped signal is consequently obtained, so that the computer in correspondence to the row read by means of said pulse obtains a binary reading word that contains information concerning the idle and the busy condition respectively of definite switch bridges or concerning the opened and the closed position respectively of definite contacts.

FIG. 5 shows a reading circuit which belongs to each of the reading points AP in the matrix AM in FIG. 3. By *r* is indicated a conductor belonging to the row, by *k* a conductor belonging to the column and by C*al* a capacitor. One of the plates of capacitor C*al* is connected to the conductor of the row and the other of the plates of which is connected to the column conductor and also to a contact on a relay V, belonging to the crossing point, from which contact in its closed position a 0-potential is obtained according to the example. The reading pulses which are obtained through the row conductor *r* have a −6 v. amplitude. The voltage of the capacitor C*al* is normal, i.e. in the release position of the relay V +8 v., owing to the fact that it is through a resistance R2 connected to a voltage source. The amplitude of the reading pulse will not be sufficient for passing through the rectifier G1 for which reason no pulse is obtained through the column conductor. If, on the contary, the capacitor has 0-potential owing to the fact that the contact belonging to the reading point has been connected to 0-potential, the voltage will decrease at the cathode side of the rectifier G1 with the amplitude of the pulse obtained and, through the column conductor, a pulse will be obtained.

The supplying of the reading pulses to the reading matrix AM is carried out by means of a selecting matrix UM (FIG. 3). In this matrix each crossing point corresponds to a row that is to be read in the reading matrix and these crossing points are activated when the row wire belonging to the respective crossing point and the column wire simultaneously obtain a pulse-shaped signal due to a binary selecting information obtained from the computer. A circuit belonging to a crossing point UP in the selecting matrix UM is shown in FIG. 5. According to the example the circuit comprises an NPN-transistor T having a base connected to the row wire, an emitter connected to the column wire and a collector connected via a resistance R6 connected to a voltage source of +8 v. and also connected to that one of the row wires in the reading matrix which is to be selected. In absence of incoming pulses the transistor is blocked and the reading wire belonging to the transistor in the reading matrix has a voltage of +8 v. When a transistor is to be activated in correspondence to the selecting signal obtained from the computer, the row wire obtains a pulse of for example +1.5 v. and the column wire a pulse of for example −1.5 v., the transistor becomes conducting and the selected row wire in the reading matrix obtains a pulse of −6 v. that passes through all such capacitors in the reading matrix which are connected to 0-potential. The rectifier G1 becomes conducting and through the column wire belonging to the rectifier a pulse will be obtained. In the sampling points in which the capacitor is connected to +8 v. the rectifier cannot become conducting in consequence of the selecting pulse of −6 v. and through the column wire no pulse will be obtained.

As it has been mentioned in connection with FIG. 2 the pulses obtained through the column wires in the reading matrix form for example a 16-digit binary information word concerning the condition of the 16 contacts belonging to the row and this word is first fed to a buffer BR and from there to the computer that uses the binary word for the continued calculation.

The selecting word that selects the row to be read out, is fed from the computer to an address buffer BA but this word must first be code translated in a suitable manner so as to be able to select a row and a column in the selecting matrix UM. The code translation can be carried out in many different ways. According to the example the selecting matrix has 11 rows and 8 columns which are selected in such a manner that in a signal translating means OV three binary digits are translated into 1 of 8 code and are used to select a column while 5 groups each comprising 2 binary digits are translated into 1 of 4 code and thus allow the selection of $4^5$ rows. Said 5 signals form the five input conditions of and-circuits OK1, OK2 and so on which belong to the respective rows. It should be noticed that there is a large number of other selecting matrices and other means, for example fast relay operation units the rows of which are each operated by one of said $4^5$ combinations.

By SMR is indicated a fast relay operation unit which by means of the binary words obtained from the computer, operates slower relay operation units which in their turn operate switches and relays in the telephone system. As has been mentioned earlier the fast relay operation units are necessary for being able to be operated by the short pulses from the computer and to maintain the information obtained in this way until the considerably more slowly operating relay units which operate the switches, have had sufficient time to be operated. The shown fast relay operation unit SMR consists of a matrix, the crossing points which each comprise a bistable circuit M1, M2 and so on which are operated by the signals of the computer, and furthermore a fast-operating relay RR1, RR2 and so on, for example a reed-relay which is connected to those of the outputs of the bistable circuit which corresponds to activated condition and which maintains closed a make contact of a current path leading to the switch operation unit VMR as long as the bistable circuit is in the activated condition. The selection of a row in the fast relay operation unit SMR is carried out in the same way as the selection of a row in the selecting matrix UM by means of the $4^5$ signal combinations obtained from the address buffer BA. The activation of the 16 individual bistable circuits included in a row occurs on the other hand through the column wires of the fast relay operation unit. Each of the column wires obtains a pulse in correspondence to the 16-digit binary word which the result register BR has obtained from the computer. To each crossing point belongs an and-circuit K1, K2, etc. one of the inputs of which is connected to the row wire and the other to the column wire, so that only those and-circuits are activated which in an addressed row obtain an operating signal from the result register BR. In this way the bistable circuit belonging to the crossing point is brought into an activated condition so that the relay operates and closes its circuit. The and-circuits OK12*a*, OK12*b*, OK13*a*, OK13*b* and so on belonging to the rows correspond to the and-circuits OK1, OK2 and so on corresponding to the selecting matrix but they are of course activated by other combinations than these. The difference is that here are found two separate and-circuits OK12*a*, OK13*a*, etc. for the activation and OK12*b*, OK13*b*, etc. for the releasing. The output signal of these last-mentioned circuits produces 0-setting of the bistable circuits belonging to the same row in consequence of which the fast-operating relays RR1, RR2, etc. belonging to the row will release. As was mentioned earlier, a fast relay operation unit SMR can serve simultaneously several, for example 10 slow units, VMR, RMR, and the number of the fast relay operation units is sufficiently large to be able to receive all the information obtained with great speed from the computer and to store this information until the respective operation has been carried out.

FIG. 4 shows a switch operation unit VMR that operates a number of, according to the example, 20 crossbar switches KV1, KV2, etc. each comprising 10 bridges VB1, VB2, etc. The switch operation unit VMR comprises relay groups, the relays of which define by their make contacts a number of alternative current paths in the for mof a contact pyramid in known manner. By the operation of relays in the relay group S1–S5 it is possible to close 32 alternative current paths, of which paths, according to the example, 20 are used to select one of 20 switches. One of 20 relays W1–W20 is operated through one of the current paths which relay through its make contact closes a current path to the selected switch, so that a bridge can be set only in the selected switch.

The switch used according to the example is a switch of the crossbar type, the so-called code relay switch in which each bridge comprises 12 rows and 17 columns of contacts. To each row there belongs a conducting bar to which one or more contacts in the respective row may be connected by operating a lifting bar belonging to the respective contact column. FIG. 6 shows an example of the grouping of the contacts of a code relay switch bridge intended for 4- pole connection of an inlet of 42 outlets, of which outlets only 40 are used. The contact columns 1–14 contain the outlet contacts and the contact columns 15–17 are used for storey selection. Each contact row represents 4 rows as the connection has 4 poles. When setting up a connection to a desired outlet one contact column in the group 1–14 and one contact column in the group 15–17 are operated and thus one outlet will be determined unambiguously. Selection of the contact columns is carried out according to the example by means of 6 code bars (in a 2-pole design, 7 code bars are necessary) which are provided with recesses, so that on parallelly displacing the code bars in different combinations there will be a recess below two of the columns, one in the group 1–14 and one in the group 15–17 which recess extends through all code bars The recesses allow passing of the turnable arms belonging to these two columns. The arms in their turn enable the bridge magnet to operate the lifting bars belonging to these columns, so that the contacts in these two columns can be closed. The bridges are of currentless type, i.e. the bridge magnets BM1, BM2, etc. operate only during operation in order to allow operation of the lifting bars after which the contacts will be closed and maintained in contact closing condition by means of spring force. FIG. 6 shows as an example the grouping of the contacts in a bridge when there is a four-pole connection between the inlet and the outlet 20 which implies that column 6 and column 16 are operated. In FIG. 6 also the position of the code bars SHI–SH6 is shown in correspondence to said switch setting with the code bars SH2, SH4 and SH5 operated, and furthermore in the rest position, i.e., the position in which the switch does not connect any inlet with an outgoing line. One of the contact groups, according to the example the contact group 42, has no outer connection and due to this said rest position will be obtained, all positions of the code relay switch being mechanically identical with each other. It is easy to see that if the contacts in the column 13 and 14 are operated, no connection to an outgoing line will be obtained and this position can serve as the rest position of the switch. Correspondingly herebelow the expression switch positions will be used generally independently whether said rest position is meant or one of the set positions. The different switch positions may thus be expressed by means of a 17-digit binary word. The position indicated in FIG. 6 where the bridge is set to the position 20, may be expressed by the binary word 00000100000000010 and the rest position may be expressed by the binary word 00000000000001100. This fact is utilized in order to give to the computer information concerning the position in which a selected switch bridge is found. The bridges are namely provided with a further contact row Z1, Z2 . . . Z17 as indicated in FIG. 6 in which for each operated contact column a contact is closed. Such contact then forms a mechanical memory from which the computer information concerning the operated contact columns, i.e. the switch position as will be explained more in detail.

The switch operation unit VMR shown in FIG. 4 contains according to the embodiment a relay group S1–S5 in which the make contacts form a contact pyramid that can close 32 alternative current paths (according to the example only 20 are used in correspondence to the number of switches) and contains furthermore a relay group VI-V4 in which the make contacts form two contact pyramids each of which can close 16 alternative current paths. Of these 16 current paths only 10 are used in the one contact pyramid in order to operate one of the 10 bridges in one of the switches and 10 current paths in the other contact pyramid in order to control the condition of these bridges as will be explained below. Furthermore the switch operation unit VMR contains a relay group HI–H6 for closing current paths which operate the 6 code bars in one of the switches (in the case of 2-pole connection there are 7 code bars and consequently a further relay R7). By means of one of the 20 current paths from the relay group S1–S5 one of the 20 relays W1–W20 is operated in correspondence to which of the 20 switches has been selected. These relays close through their contacts current paths for the operation of the bridges and of the code bars in the selected switch while the current paths to the not selected switches are maintained interrupted. The switch operation unit also contains a relay K1 for connecting current to the current paths for the operation of the bars, a relay K2 for connecting current to the current paths for the operation of the bridges and a relay K6 for connecting current to the test paths of the bridges as it will be explained below. The switch operation unit VMR obtains current for the operation of all said relays through current paths 1–20 from the make contacts of the relays RR1–RR20 in the fast relay operation unit SMR.

When for example, the bridge VB1 in the switch KV2 is to be set to the position 20 the process will be the following:

At first, the relays H1–H7 obtain information, through the wires 1–7, concerning which code bars are to be operated; the relays V1–V4 obtain information, through the wires 8–11, concerning the bride number in binary form; and the relays S1–S5 obtain information, through the wires 12–16, regarding the switch number in binary form. According to the example the relays H2, H4, H5 (see FIG. 6), the relay V4 (bridge No. 1, in binary code 0001) and the relay S4 (switch No. 2 in binary code 00010) will operate. After a test has been carried out in order to control that the relays have operated according to the order, the W–relay, according to the example relay W2, selected through the relays S1–S5 obtains an operation order from the fast relay operation unit SMR via the current path 17. Due to this the selected switch KV2 is connected to VMR. Then the relay K1 obtains an operation order through the current path 18 from unit SMR and connects current for operation of the code bars SH2, SH4, SH5. Then the relay K2 obtains an order to operate through the wire 19 and connects in turn operating voltage to the bridge VB1 in the switch KV2, so that the bridge magnet BM1 in switch KV2 operates and releases the spring force acting upon the contacts. Then relay K2 releases and interrupts the current to the bridge and the spring force in the bridge can again act and close the contact columns which have been selected by the setting of the code bars. Then all relays in switch VMR will release and the bridge setting is completed.

Figures 7A, 7B, 7C, 7D, 7E, 7F, 7G, 7H, 7J, 7K:
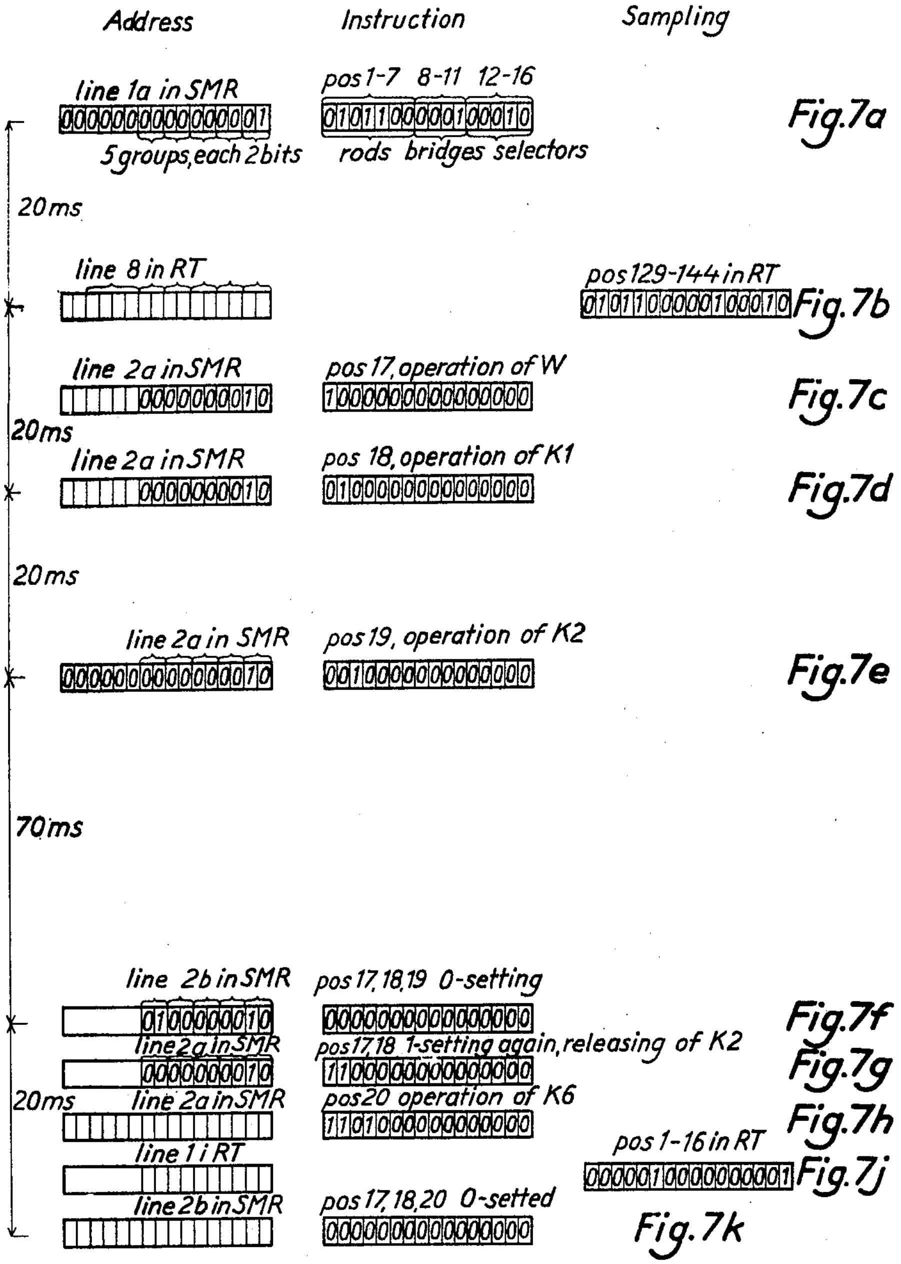

The processes occur with a certain time interval which is determined by the function of the computer. This function is mentioned here only to the extent necessary for explaining the idea of the invention. FIG. 7 shows the information obtained from the computer and sent to the computer, in the form of 16-digit binary words. According to the example in the fast relay operation unit SMR the points 1–16 in the first row of the matrix are intended to influence the current paths 1–16 which operate the relays H1–H7, V1–V4, and S1–S5. This is carried out in such a way that row 1 is selected by means of an address code in the form of 16-digit binary word from the address register BA and the intended points in the row are activated by means of a 16-digit binary word which is obtained from the result register BR. FIG. 7*a* shows these two binary words. FIG. 7 is divided into 3 columns, of which columns, the first shows the address obtained from the computer, the second shows the instruction obtained from the computer and the third shows the information concerning the condition of the connecting means, sent from the telephone system to the computer. The address word according to FIG. 7*a* is of no interest in connection with the example described, as it is selected to be a combination of five 4-digit binary words in the same way as has been described in connection with FIG. 3. The instruction word in FIG. 7*a* contains on the other hand information for the selection of the position 20 in the bridge No. 1 of the selector No. 2, i.e. the binary digit 1 in the digit positions 2, 4 and 5 (relays H2, H4, H5), in the digit position 11 (the relay V4) and in the digit position 15 (relay S5).

At the time +20 milliseconds (ms.) from the beginning of the process a test of the operated relays is carried out. The computer, by means of an address, selects in the test unit RT a row consisting of the points 129–144 to which the contacts of the relays which have been operated in VMR connect 0-potential. As it has been explained in connection with FIG. 3 the computer obtains from the test unit RT a 16-digit binary word that indicates which relays are operated. This word has to be identical with the instruction word fed to the columns of SMR. FIG. 7*b* shows the address word for selecting the points 129–144 in unit RT and the control word that is sampled from unit RT. If the control shows that the selection was correct the row No. 2 in unit SMR is selected and the matrix point 17 is activated by means of a 16-digit instruction word according to FIG. 7*c*.

At the time +40 ms. the relay K1 obtains an operation order by selection of row 2 in SMR and activation of the point 18 (see FIG. 7*d*) which implies that the magnets of the selected code bars are operated (see the description of FIG. 4).

At the time +60 ms. relay K2 obtains an operation order by selecting the row 2 in SMR and activating the point 19 (see FIG. 7*e*). In consequence of this, the selected bridge operates. It should be pointed out also in this connection that the code relay switch according to the example works with currentless bridges, i.e. the contacts are held in the closed position by means of spring forces and the operation of the bridge has only the purpose of allowing the spring force acting on the contacts to be released and the operation of new contacts to be prepared. Then again no current will pass through the bridge magnet and the spring force closes the contact. As this process needs a certain time this is the explanation why the holding current of the bridge is not released before the time +130 ms. by 0-setting the bistable circuit in point 19 of unit SMR. According to FIG. 3 each row in unit SMR has two row wires, one wire which together with the pulse to the respective column can bring the bistable circuits to a working position and the other wire which sets all bistable circuits in the row to the 0-position. The binary word that activates this last-mentioned row is now fed from the address buffer to unit SMR and consequently the bistable circuits 17, 18 and 19 are 0-set (FIG. 7*f*). But, immediately thereafter the bistable circuits 17 and 18 (FIG. 7*g*) will be set to 1, so that the current ceases only in the circuit 19 and the bridge magnet releases. Before all relays have been released in order to make unit VMR free for the next operation there will be carried out according to the present invention a control that the switch bridges have been set to correct position.

As has been mentioned earlier in connection with the description of the code relay switch, each bridge has an additional contact row (Z1, Z2 . . . Z17) so as to be able to determine which of the contact columns are actuated. To the contacts in this row belongs a bar in the same manner as in the other rows. But, this bar is divided into two parts in correspondence to the two contact groups 1–14 and 15–17 respectively and each bar is through a separate rectifier connected to a point in a test matrix TM. These matrix points can have two alternative voltages and they are through the two operated test contacts of the bridges (as mentioned earlier two columns must always be operated in a bridge also in rest position) connected to two reading points AP in the test unit RT. As has been mentioned above a 17-digit binary word is necessary for defining the position of a bridge. As the words which are sampled and forwarded to the computer are 16-digit words it will, in certain cases, be necessary to use two rows in the test unit for sampling the position of the switch. This is however solved by the program of the computer and has nothing to do with the fundamental idea of the invention. According to the example in the test unit RT the points 1–16 in row 1 and point 145 in row 13 are intended for sampling the position of an arbitrary bridge among the 200 bridges belonging to the 20 switches. For another switch operation unit and for the bridges belonging to this unit for example the points 17–32 in row 2 and the point 146 in row 13 are used.

As has been mentioned the matrix points in the test matrix TM have two alternative voltages through which the operated test contacts in the bridge are connected to two of the 17 test points. The test matrix has 20 horizontal wires in correspondence to the 20 switches and 10 vertical wires in correspondence to the 10 bridges. Each coordinate wire is through a resistance R connected to +24 v. The two parts of the bar with which the test contacts of the bridge are in contact, are connected to a crossing point common for the two parts (SD1/1, SD2/1 . . . SD10/20) in the test matrix TM and defining one of the bridges. Each crossing point in the test matrix is connected to the horizontal wire and to the vertical wire belonging to the same through a resistance R the value of which is equal to the resistance through which the horizontal wires and the vertical wires respectively are connected to +24 v. source. In this manner for each crossing point a voltage divider is formed by the resistances R. By closing the contact of the relay K6, 0-potential has been connected according to the invention to the vertical wires in the test matrix TM through the contact pyramid V1–V4 that selects one of the 10 bridges and also to the horizontal wires through the contacts of the relays W1–W20 which select a switch. By connecting 0-potential to a horizontal wire and to a vertical wire the result will be that only the crossing point belonging to the selected bridge obtains 0-potential while the crossing points belonging to a selected horizontal wire and to a selected vertical wire respectively obtain +8 v. and the crossing points having no selected horizontal or vertical wire obtain +16 v. as it is easy to see. Consequently only one of the 200 bridges obtain 0-potential to their closed test contacts which supply 0-potential to the respective crossing points of the test unit RT and thus the computer will obtain information concerning the position of the selected bridge as has been explained in connection with the description of the test unit.

The bridge is tested normally after each operation in order to determine that the desired bridge setting has been obtained. The computer also controls that only one contact within the group for selection of an individual outlet according to the example 1–14 and within the group for selection of storey according to the example 15–17 is closed. More or fewer contacts indicate a fault in the bridge. FIG. 7*h* shows the binary word that causes operation of the relay K6 and FIG. 7*j* the binary word that is obtained upon testing the bridge already set which according to the example was the bridge No. 1 in switch No. 2. This bridge is now selected by the switch operation unit VMR and owing to the fact that it has been set to position No. 20 there will be obtained the binary word 00000100000000010 from the crossing points 1–16 and 145 of the test unit RT which are common for all the 200 bridges. In FIG. 7 only the 16 first digit positions of said binary word are shown for the sake of simplicity. Of course also the 17th digit position is transferred to the computer by means of a second 16-digit word and the information is then treated as a single continuous word.

As it appears the invention makes it possible that the same 17 crossing points in the test unit RT give an answer concerning the position of an arbitrary bridge that has been selected among the 200 bridges in spite of the fact that the actuated contacts in all these bridges are commonly connected to the points in the test unit RT. This arrangement makes it possible to control the memory content of the computer and to trace a connecting path through the switches.

We claim:

1. In a telecommunication system wherein electronic control means by coded combinations of voltages representing binary numbers operate relay operation units, which in turn operate or select connecting means: a plurality of crossbar switches, each of said crossbar switches including a plurality of bridges selectable by said electronic control means, via said relay operation units and said connecting means, each of said bridges of said crossbar switches having a set of indicating contacts, each of said indicating contacts being associated with a definite bridge of the crossbar switch, a plurality of potential dividers each having a tap, each of said potential dividers being associated with one of the indicating contacts of each of the bridges of said crossbar switches, whereby when an indicating contact is activated it connects the tap of its associated potential divider, means connected to said potential dividers for establishing a predetermined potential on the tap of the potential divider associated with the selected bridge and for establishing a potential other than said predetermined potential on the taps of the potential dividers of the unselected bridges, and a common reading circuit means including a plurality of reading circuits, each of said reading circuits being associated with the same indicating contact of each of said crossbar switches, said common reading circuit means transmitting a coded combination of voltages representing a binary number indicating the state of the bridges of a selected crossbar switch to said electronic control means.

2. The system of claim 1, wherein said potential dividers are connected to a matrix of row conductors and column conductors, each row conductor being associated with one of said crossbar switches, each of said column conductors being associated with a particular bridge of the crossbar conductors, means for selectively applying potentials to the row conductors and the column conductors, said potentials being selected in such a way that the potential of the tap of only the potential divider associated with the selected bridge is at said predetermined potential.

3. A circuit arrangement in an automatic telecommunication system comprising crossbar switches having bridges, each of said bridges being settable to a number of different outlet positions, for indicating in the form of a binary number a position to which a crossbar switch has been set, said telecommunication system comprising furthermore at least a computer which by means of binary word-operated selecting means selects required switches and bridges thereof for operation or selects one of said switches in order to sample outputs indicating their condition, each of said bridges having a group of indicating contacts of which at least one definite contact is operated in each bridge position and which contact groups due to the two different positions of the contacts represent a binary word characteristic for the position of the bridge, a plurality of reading circuits each common for indicating contacts operated in the same outlet position of all the bridges, said reading circuits having two alternative output potentials one potential corresponding to a rest condition and the other potential corresponding to a working condition, the outputs of said reading circuits forming a binary word samplable by said computer and representing a bridge position, a voltage divider associated with each of the bridges of each switch and having a tap to which each of the operated indicating contacts is connected, the potential of said tap corresponding to one of said two output potentials when the terminals of said voltage dividers are connected to another determined potential, said selecting means connecting said other determined potential to the voltage divider belonging to a required bridge so that of all the bridges only the indicating contacts of said required bridge produce said determined potential while the indicating contacts of the other bridges cannot influence said sampling circuits.

References Cited

UNITED STATES PATENTS 2,832,834 4/1958 Oberman.
3,205,313 9/1965 Brunberg et al. ------ 179—22

WILLIAM C. COOPER, Primary Examiner